United States Patent [19]
Asayama et al.

[11] 4,299,121
[45] Nov. 10, 1981

[54] SUCTION SYSTEM IN AN ENGINE

[75] Inventors: Yoshiaki Asayama; Kazuyuki Mizuta, both of Himeji, Japan

[73] Assignee: Mutsubishi Denki Kabushiki Kaisha, Tokyo, Japan

[21] Appl. No.: 128,122

[22] Filed: Mar. 7, 1980

[51] Int. Cl.³ ............................ G01F 1/32; G01F 1/72
[52] U.S. Cl. ........................................ 73/118; 73/199; 73/861.22
[58] Field of Search ...................... 73/118, 199, 861.22; 123/494

[56] References Cited

U.S. PATENT DOCUMENTS

| | | | |
|---|---|---|---|
| 3,818,877 | 6/1974 | Barrera et al. | 123/494 |
| 3,965,730 | 6/1976 | Innes | 73/118 |
| 4,011,757 | 3/1977 | Baatz | 73/199 X |
| 4,141,240 | 2/1979 | Usui et al. | 73/199 X |
| 4,228,768 | 10/1980 | Kita | 73/861.22 X |
| 4,257,276 | 3/1981 | Kita et al. | 73/861.22 |

*Primary Examiner*—Charles A. Ruehl
*Attorney, Agent, or Firm*—Wenderoth, Lind & Ponack

[57] ABSTRACT

In a suction system in an engine a suction air volume detecting means utilizing a von Kármán's vortex air flowmeter principle has its upstream side and downstream side being in communication with an air cleaning chamber and an expansion chamber, respectively, with a vibration membrane being disposed therebetween, whereby the influence of the pulsating suction air on the suction air volume detecting means is effectively suppressed so that it operates stably.

4 Claims, 2 Drawing Figures

SUCTION SYSTEM IN AN ENGINE

BACKGROUND OF THE INVENTION

The present invention relates to a suction system in an engine, and more particularly to a suction system provided with a suction air volume detecting means for use in an automotive engine.

Hitherto, one type of suction air volume detecting means in an automotive engine, as disclosed e.g. in Japanese Laid-Open Patent Publication No. 130718/1976 (corresponding to U.S. Pat. No. 3,956,928) which uses von Kármán's vortex flowmeter principle has been proposed. However, in order for the von Kármán's vortex flowmeter to operate stably it is indispensable that the von Kármán's vortex generated by generating elements be generated regularly and stably. However, as well known in the art, the air to be sucked into an automotive engine undergoes a strong pulsation, and, in particular, the pulsation of the suction air is severest near the full opening of the throttle valve in a four cycle internal combustion engine, i.e. near its full load condition so that the von Kármán's vortexes are greatly affected, making the vortex generation unstable, resulting in errors in the detected volume of the suction air.

One patent showing the state of art having a relatively close connection with the present invention is U.S. Pat. No. 3,722,275 issued on Mar. 27, 1973 which discloses a blunt body flowmeter arrangement for use in controlling air pollution produced by internal combustion engines. Although this flowmeter resembles a von Kármán's air flowmeter to which the present invention relates, in principle, the former is exclusively used for monitoring the air intake of the combustion engine for the purpose of controlling the atmospheric pollution by such engines, but this patent does not disclose the flowmeter in combination with an air cleaning chamber and an expansion chamber as in the present invention.

SUMMARY OF THE INVENTION

It is a primary object of the present invention to provide an air suction system in an engine, in particular an automotive engine, provided with a suction air volume detecting means utilizing a von Kármán's vortex flowmeter principle which can greatly reduce the influence of the pulsation of the suction air on the accuracy of the detected volume.

In accordance with the present invention an air suction system for an automotive engine is provided in which the upstream side of a suction air volume detecting means utilizing a von Kármán's vortex flowmeter principle is connected to an air cleaning chamber of the engine, while the downstream side is connected to an expansion chamber in communication with a suction pipe of the engine, the upstream and the downstream sides being arranged in adjoining relation with both sides being separated by a vibration membrane.

In accordance with one aspect of the present invention a bypass pipe is also provided to connect the air cleaning chamber and the expansion chamber in parallel with the suction air volume detecting means.

BRIEF DESCRIPTION OF THE DRAWINGS

Other objects and advantages of the present invention will become apparent from the following description taken in connection with the accompanying drawings wherein are set forth by way of illustration and example certain embodiments of this invention.

DETAILED DESCRIPTION OF THE PREFERRED EMBODIMENTS

Figure 1:
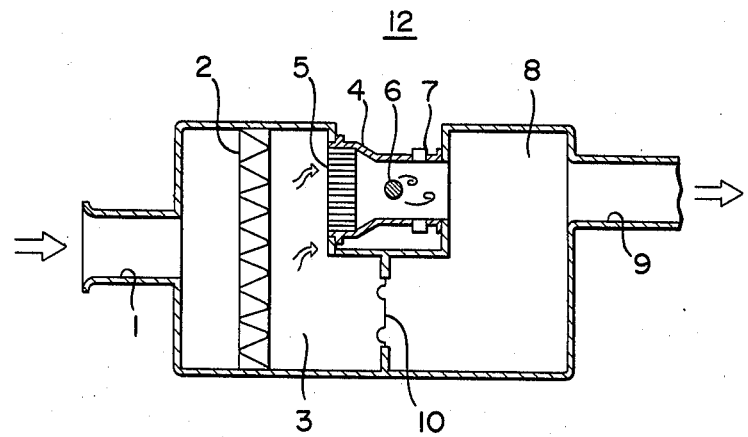
FIG. 1 is a diagrammatical representation of an embodiment of the present invention in a longitudinal sectional view.

Now referring to FIG. 1 of the drawings 1 designates an air intake pipe to conduct air into an air suction system of an engine from the outside, 2 an air cleaner, e.g. filting paper, 3 an air cleaning chamber in which air cleaner 2 is contained, and 4 the body of a suction air volume detecting means utilizing a von Kármán's vortex flowmeter principle and in which are contained an air distributor 5, a vortex generating element 6 and a vortex detector 7 so as to constitute a suction air volume detecting means 12. 8 designates an air expansion chamber in communication with the downstream side of suction air volume detecting means 12, and 9 designates a duct to connect expansion chamber 8 with an air suction pipe of the engine not shown. 10 designates a vibration membrane formed by e.g. a diaphragm constituting a partition between the upstream side of suction air volume detecting means 12, i.e. air cleaning chamber 3 and its downstream side, i.e. expansion chamber 8, whereby air cleaning chamber 3 and expansion chamber 8 are arranged so as to adjoin each other with both chambers 3 and 8 being separated by vibration membrane 10.

In such a construction, when the engine is started the air sucked in by the engine passes through air intake pipe 1, and is led into air cleaning chamber 3 after being filtered by air cleaner 2. The suction air volume is detected by suction air volume detecting means 12 when the air is introduced into it through air distributor 5. The suction air, the volume of which has been detected by vortex detector 7 when it passes through detecting means 12, then passes through expansion chamber 8 to be led to the suction pipe of the engine through duct 9.

As the suction air pulsates strongly near the full load of the engine, vibrating membrane 10 oscillates in response to the pulsation, thereby reducing the pulsation of the suction air flowing through suction air volume detecting means 12 so that the detection of the suction air volume takes place stably. According to experiments carried out by the inventors on a four cycle home-made automotive engine having a displacement of 2,000 cc it was confirmed that a cloth-filled diaphragm having a diameter of 100 mm and a thickness of 0.3 mm used as the membrane 10 satisfactorily effected the suppression of pulsation of the suction air. On the other hand, when vibrating membrane 10 oscillates a noise is generated depending upon the frequency of the oscillation, but because it is transmitted to the outside from air intake pipe 1 through air cleaner 2 it is damped when it passes through air cleaner 2, and the noise is damped also when it passes air intake pipe 1 having a small cross-sectional area compared with that of air cleaning chamber 3. Therefore, the detrimental effects of the noise are substantially eliminated.

Figure 2:
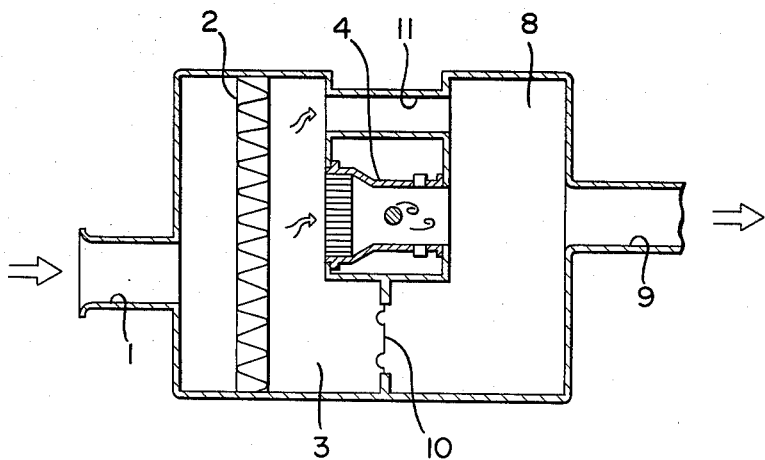
FIG. 2 is a similar representation to FIG. 1 showing another embodiment of the present invention.

In contrast with the embodiment shown in FIG. 1, as shown in FIG. 2, an embodiment in which a bypass pipe 11 is added to connect air cleaning chamber 3 and expansion chamber 8 in parallel with suction air volume detecting means 12 exhibits, of course, similar effects to those of the embodiment described above and shown in FIG. 1.

From the foregoing it will be appreciated that since in the present invention the suction air volume detecting means utilizing a von Kármán's vortex flowmeter principle has its upstream and downstream sides connected to the air cleaning chamber and to the expansion chamber in communication with the suction pipe of the engine, respectively, and the air cleaning chamber and the expansion chamber are arranged so as to adjoin each other with the vibration membrane being disposed therebetween to form a partition, the effect of the pulsation of the suction air on the suction air volume detecting means can be effectively reduced and at the same time the noise caused by the oscillation of the vibration membrane is suppressed.

What is claimed is:

1. A suction system in an engine comprising a suction air volume detecting means to detect the volume of air to be sucked into said engine, an air cleaning chamber in communication with said suction air volume detecting means at its upstream side, an expansion chamber in communication with said suction air volume detecting means at its downstream side and disposed in adjoining relation with said air cleaning chamber, and a vibration membrane disposed between said cleaning chamber and said expansion chamber so as to separate them.

2. A suction system in an engine as clained in claim 1 wherein said suction air volume detecting means is a von Kármán's vortex airflow meter.

3. A suction system in an engine as claimed in claim 1 wherein said vibration membrane is a diaphragm.

4. A suction system in an engine as claimed in claim 1 or 2 wherein said air cleaning chamber and said expansion chamber are additionally connected by a bypass tube in parallel with said suction air volume detecting means.

* * * * *